United States Patent
Hicok et al.

[11] Patent Number: 5,673,409
[45] Date of Patent: Sep. 30, 1997

[54] SELF-DEFINING INSTRUCTION SIZE

[75] Inventors: Gary Dwayne Hicok, Mesa, Ariz.; Thomas Alexander, Hillsboro, Oreg.; Yong Je Lim; Yongmin Kim, both of Seattle, Wash.

[73] Assignee: VLSI Technology, Inc., San Jose, Calif.

[21] Appl. No.: 40,685

[22] Filed: Mar. 31, 1993

[51] Int. Cl.⁶ .................. G06F 9/00; G06F 15/00
[52] U.S. Cl. ............... 395/381; 395/382; 395/391
[58] Field of Search .................. 395/775, 375, 395/425, 800, 381–391

[56] References Cited

U.S. PATENT DOCUMENTS

| | | | |
|---|---|---|---|
| 3,611,306 | 10/1971 | Reigel | 340/172.5 |
| 4,649,477 | 3/1987 | MacGregor et al. | 395/775 |
| 4,679,140 | 7/1987 | Gotou et al. | 395/775 |
| 4,811,266 | 3/1989 | Woods et al. | 364/736.5 |
| 4,812,971 | 3/1989 | Butts, Jr. et al. | 395/375 |
| 5,214,763 | 5/1993 | Blaner et al. | 395/375 |
| 5,233,694 | 8/1993 | Hotta et al. | 395/375 |
| 5,241,636 | 8/1993 | Kohn | 395/375 |
| 5,268,855 | 12/1993 | Mason et al. | 364/748 |
| 5,274,776 | 12/1993 | Senta | 395/375 |
| 5,313,644 | 5/1994 | Matsuo et al. | 395/800 |
| 5,337,415 | 8/1994 | DeLano et al. | 395/375 |

*Primary Examiner*—Ayaz R. Sheikh
*Attorney, Agent, or Firm*—Harry M. Weiss; Jeffrey D. Moy; Harry M. Weiss & Associates, P.C.

[57] ABSTRACT

A method and apparatus for defining, in a computing system, the bit size of an instruction to be executed by a processing unit. Instructions are realized in the form of a plurality of memory location devices. At least one of said memory location devices, in a predetermined position, is established as a MODE bit. The MODE bit assumes a first value indicative of parallel instruction execution and assumes a second value indicative of non-parallel instruction execution.

6 Claims, 1 Drawing Sheet

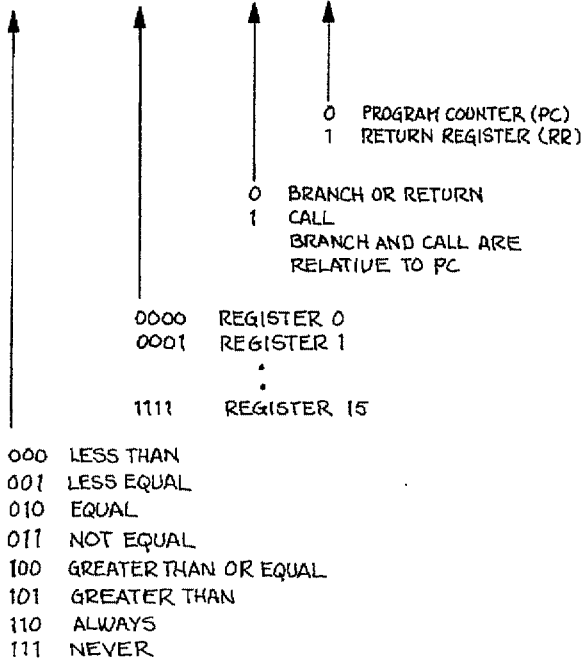

TEST & BRANCH

| 1 | 1 | 3 | 3 | 4 | 4 | 1 | 1 | 14 |
|---|---|---|---|---|---|---|---|---|
| MODE | 0 | 010 | COND | REG 1 | REG 2 | INDX | RTN | OFFSET |
| 31 | 30 | 29 27 | 26 24 | 23 20 | 19 16 | 15 | 14 | 13 0 |

- 0 PROGRAM COUNTER (PC)
- 1 RETURN REGISTER (RR)

- 0 BRANCH OR RETURN
- 1 CALL

BRANCH AND CALL ARE RELATIVE TO PC

- 0000 REGISTER 0
- 0001 REGISTER 1
- •
- •
- 1111 REGISTER 15

- 000 LESS THAN
- 001 LESS EQUAL
- 010 EQUAL
- 011 NOT EQUAL
- 100 GREATER THAN OR EQUAL
- 101 GREATER THAN
- 110 ALWAYS
- 111 NEVER

EXAMPLES: TBR (CONDITION), (REG1), (REG 2), (OFFSET)
TBR - TEST AND BRANCH

CALL (OFFSET)
RTN

BRA (CONDITION), (OFFSET)
BRA - BRANCH

SELF-DEFINING INSTRUCTION SIZE

CROSS-REFERENCE TO A RELATED APPLICATION

Cross-reference is made to U.S. patent application Ser. No. 08/286,662 which is now U.S. Pat. No. 5,511,174, entitled "METHOD FOR CONTROLLING THE OPERATIONS OF A COMPUTER IMPLEMENTED APPARATUS TO SELECTIVELY EXECUTE INSTRUCTIONS OF DIFFERENT BIT LENGTH" filed on the same date and by the same inventors, and disclosure of the above-referenced application is hereby incorporated by reference into this Application.

FIELD OF THE INVENTION

This invention relates to computer and microprocessor systems and, more particularly, to a technique for determining the bit size of an instruction that is to be executed by the computer or microprocessor system.

BACKGROUND OF THE INVENTION

Typically the central processing unit (CPU) of a computer or microprocessor system operates on and in response to fixed-width instructions, that is, instructions that consist essentially of a predetermined fixed number of bits, e.g., 8, 16, or 32 bits. However, in order to enable superscalar operation, instructions widths of, for example, up to 64 bits are required. Conventionally, the Long Instruction Word (LIW) processor necessarily operates in the context of a fixed instruction width of, for example, 64 bits. Because parallel execution of two 32-bit instructions may not be uniformly available, the microprocessor system must accommodate 64-bit instructions. In modes of operation wherein 64-bit instructions are not necessary, a significant portion of the 64-bit instruction data is not used. As a result, cache, instruction memory and memory bandwidth are wasted.

One approach to this dilemma includes the selective provision of two noninclusive modes of operation: 32-bit non-parallel or 64-bit parallel execution. This approach requires the system user or designer to compromise either memory-usage efficiency or processing performance. The approach advanced by the subject invention circumvents the need for such a compromise by providing a technique for defining the instruction size, from among a predetermined set of available instruction sizes, uniquely to each operation to be executed.

SUMMARY OF THE INVENTION

The above and other objects, advantages and capabilities are achieved in one aspect of the invention by a method and apparatus for defining, in a computing system, the bit size of an instruction to be executed by a processing unit. Instructions are realized in the form of a plurality of memory location devices. At least one of said memory location devices, in a predetermined position, is established as a MODE bit. The MODE bit assumes a first value indicative of parallel instruction execution and assumes a second value indicative of non-parallel instruction execution. In accordance with parallel operations, a current instruction is executed in parallel with a previously-called instruction.

BRIEF DESCRIPTION OF THE DRAWING

The sole Drawing depicts a 32-bit instruction word configured in accordance with the subject invention. The instruction word contains a MODE bit in the 31st location.

DESCRIPTION OF A PREFERRED EMBODIMENT

For a complete understanding of the subject invention, reference is made to the following Description and appended Claims, in conjunction with the above-described Drawing.

As indicated above, the subject invention relates to a technique for defining the size, measured in bits, of an instruction to be executed by a computing system, and particularly, by a microprocessor configured in accordance with superscalar architectures. In a specific implementation, the inventive technique is used in conjunction with a processor to switch between 32-bit and 64-bit instruction sizes. The technique establishes a single bit, referred to herein as the MODE bit, in a predetermined position in an instruction word. The value, which may be either a logical ONE or ZERO, of the MODE bit then indicates whether successive instructions are to be executed in a parallel or in a non-parallel mode. For example, when the MODE bit is set (assumes a logical value of ONE), the processor will cause a current 32-bit instruction to be executed in parallel with the previous 32-bit instruction, effectively executing a 64-bit instruction.

The manner in which the above-described operation may be realized is depicted in the Drawing, which illustrates the arrangement of a 32-bit instruction word as it might exist in the memory storage of a microprocessor system. In a well-understood manner, the instruction word comprises 32 bits of binary data, each of which is stored in a memory location device. The memory location devices are, in a preferred embodiment of the invention, semiconductor memory registers. As indicated in the Drawing, location 31 accommodates the MODE bit. (The remaining locations of the instruction are assigned functions according to the design architecture of the microprocessor. The function assignments are illustrated in the Drawing, but do not comprise part of the invention claimed herein.)

In a manner unambiguously apprehended by practitioners having ordinary skill in the art, the microprocessor may be programmed (with software or firmware), or may include hardware, to select and evaluate the MODE bit, and then operate in a parallel or non-parallel execution mode accordingly.

It will be appreciated by those skilled in the art that the above invention alleviates memory problems associated with superscalar computing architectures. The invention permits operation with less internal cache, more modest external memory and a narrow memory data bus that supports parallel execution.

Accordingly, although there has been disclosed and described what at present is deemed to be a preferred embodiment of a self-defining instruction technique, it will be obvious to those having ordinary skill in the art that various modifications or equivalents of the subject invention may be devised without departure from the scope of the invention, as defined by the appended Claims.

We claim:

1. A method for defining a size of an instruction to be executed by a processing unit, the method comprising the steps:

(a) storing a plurality of instructions in a memory storage means, each of said plurality of instructions comprising a number of bits;

(b) establishing a single bit location in a predetermined bit location in each of said plurality of instructions, said single bit being a MODE bit which has a first value indicating parallel execution wherein a current instruction is executed in parallel with a successive instruction and a second value indicating non-parallel execution wherein said current instruction is executed by itself; and (c) reading said MODE bit in each of said plurality of instructions to determine if said current instruction is to be executed in parallel manner with said successive instruction or if said current instruction is to be executed in a non-parallel manner.

2. A method as defined in claim 1 wherein the first value and the second value are binary.

3. The method of claim 1 wherein said step of establishing a single bit location in a predetermined bit location in each of said plurality of instructions further comprises the step of establishing a MODE bit in a last bit location in each of said plurality of instructions.

4. In a computing system having a processor, a memory storage means storing a plurality of instructions, each of said plurality of instructions comprising a number of bits, wherein at least one bit in a predetermined location in each of said plurality of instructions contains MODE data, said MODE data having a first value indicative of parallel instruction execution wherein a current instruction is executed in parallel with a successive instruction and a second value indicative of non-parallel instruction execution wherein said current instruction is executed by itself.

5. A memory storage apparatus as defined in claim 4, wherein the first value and the second value are binary values.

6. The computing system of claim 4 wherein said MODE data is stored in a last bit location in each of said plurality of instructions.

* * * * *